United States Patent
Chen et al.

(10) Patent No.: US 9,052,727 B2
(45) Date of Patent: Jun. 9, 2015

(54) POWER SUPPLY CIRCUIT, SWITCHING REGULATOR, AND CONTROL CIRCUIT AND CONTROL METHOD THEREOF

(71) Applicants: Yu-Chang Chen, Nantou (TW); Kuan-Cheng Lai, Zhubei (TW)

(72) Inventors: Yu-Chang Chen, Nantou (TW); Kuan-Cheng Lai, Zhubei (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 217 days.

(21) Appl. No.: 13/767,556

(22) Filed: Feb. 14, 2013

(65) Prior Publication Data

US 2013/0207628 A1    Aug. 15, 2013

(30) Foreign Application Priority Data

Feb. 15, 2012  (TW) .................................. 101104827

(51) Int. Cl.
*G05F 1/563* (2006.01)
*G05F 1/10* (2006.01)
(52) U.S. Cl.
CPC ........................................ *G05F 1/10* (2013.01)
(58) Field of Classification Search
CPC ...................... G05F 1/563; H02M 2001/0025
USPC ......... 323/280, 281, 282, 283, 284, 285, 286, 323/274
See application file for complete search history.

(56) References Cited

U.S. PATENT DOCUMENTS

| | | | |
|---|---|---|---|
| 7,489,532 B2 | 2/2009 | Shih | |
| 7,508,180 B2 * | 3/2009 | Chen et al. | 323/282 |
| 8,018,694 B1 * | 9/2011 | Wu | 361/18 |
| 2004/0008528 A1 | 1/2004 | Umemoto et al. | |
| 2008/0211465 A1 * | 9/2008 | Kung et al. | 323/222 |
| 2009/0315397 A1 | 12/2009 | Udo | |
| 2010/0026267 A1 * | 2/2010 | Easwaran et al. | 323/288 |
| 2013/0285632 A1 * | 10/2013 | Chen et al. | 323/282 |
| 2014/0049994 A1 * | 2/2014 | Ishii | 363/49 |
| 2014/0210445 A1 * | 7/2014 | Hasegawa | 323/284 |

FOREIGN PATENT DOCUMENTS

TW    I425755 B    2/2014

* cited by examiner

*Primary Examiner* — Adolf Berhane
*Assistant Examiner* — Sisay G Tiku
(74) *Attorney, Agent, or Firm* — Tung & Associates (57) ABSTRACT

The present invention discloses a switching regulator having a control circuit which includes an error amplifier circuit. The error amplifier circuit compares a feedback signal relating to an output voltage with a reference signal, to regulate the feedback signal to a level of the reference signal. When it is determined that the switching regulator has entered a shutdown procedure, the reference signal gradually decreases so that the output voltage is decreased to a shutdown threshold.

18 Claims, 5 Drawing Sheets

POWER SUPPLY CIRCUIT, SWITCHING REGULATOR, AND CONTROL CIRCUIT AND CONTROL METHOD THEREOF

CROSS REFERENCE

The present invention claims priority to TW 101104827, filed on Feb. 15, 2012.

BACKGROUND OF THE INVENTION

1. Field of Invention

The present invention relates to a switching regulator and a control method for controlling a switching regulator; particularly, it relates to a switching regulator and a control method for controlling a switching regulator which gradually decreases the output voltage to a shutdown level according to the input voltage when the switching regulator enters a shutdown procedure.

2. Description of Related Art

Figure 1A:
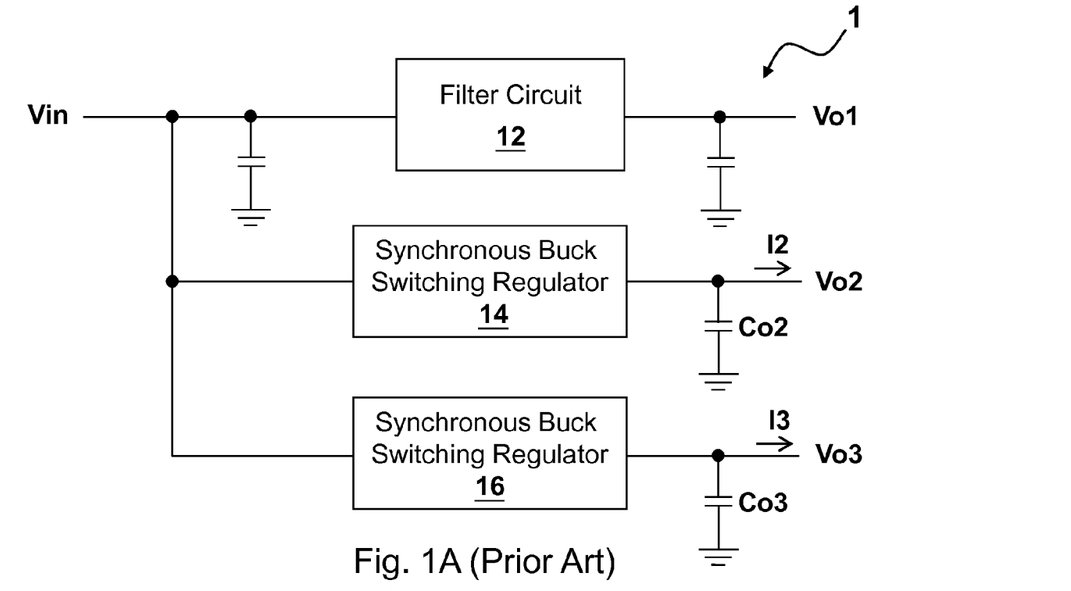
FIG. 1A shows a conventional power supply circuit.
Figure 1B:
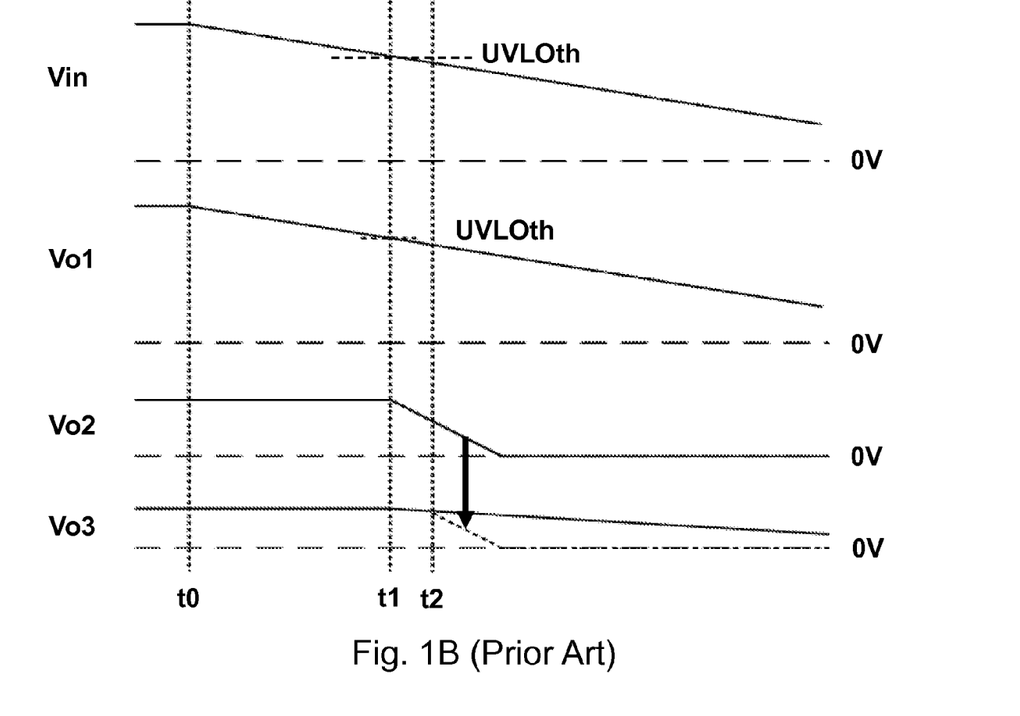
FIG. 1B illustrates the signal waveforms corresponding to the circuit of FIG. 1A.

FIG. 1A shows a conventional power supply circuit. As shown in FIG. 1A, the power supply circuit 1 comprises a filter circuit 12 and two synchronous buck switching regulators 14 and 16, respectively filtering and converting the input voltage Vin (for example, 12V) to the output voltages Vo1 (for example, 12V), Vo2 (for example, 5V) and Vo3 (for example, 3.3V). When the power supply circuit 1 enters a shutdown procedure, the signal waveforms of the input voltage Vin and the output voltages Vo1, Vo2 and Vo3 are as shown in FIG. 1B. The so-called shutdown procedure means that the input voltage Vin begins to decrease, and when it is below an Under-Voltage Lockout threshold UVLOth, the synchronous buck switching regulators 14 and 16 stop converting the input voltage Vin to the output voltages Vo2 and Vo3, and the load circuits start decreasing the output voltages Vo2 and Vo3 until they drop to a shutdown threshold (typically 0V).

Please refer to FIG. 1B in conjunction with FIG. 1A. When the shutdown procedure begins at the time point t0, the input voltage Vin begins to decrease. When the input voltage Vin decreases to the Under-Voltage Lockout threshold UVLOth at the time point t1, the synchronous buck switching regulators 14 and 16 stop regulating the output voltages Vo2 and Vo3. At this moment, if the load circuit receiving the output voltages Vo3 (3.3V) is in a light load or no load condition, while the load circuit receiving the output voltages Vo2 (5V) is in a heavy load condition, then the loading current I2 is greater than the loading current I3. In this case, the charges stored in the output capacitor Co3 will be discharged by a slower speed than the charges stored in the output capacitor Co2. As a result, during the shutdown procedure, an undesired situation occurs (indicated by the arrow shown in FIG. 1B) where the output voltage Vo3 (3.3V in a normal operation) is greater than the output voltage Vo2 (5V in a normal operation) after the time point t2, which violate the general specification of the power supply circuit.

Figure 2A:
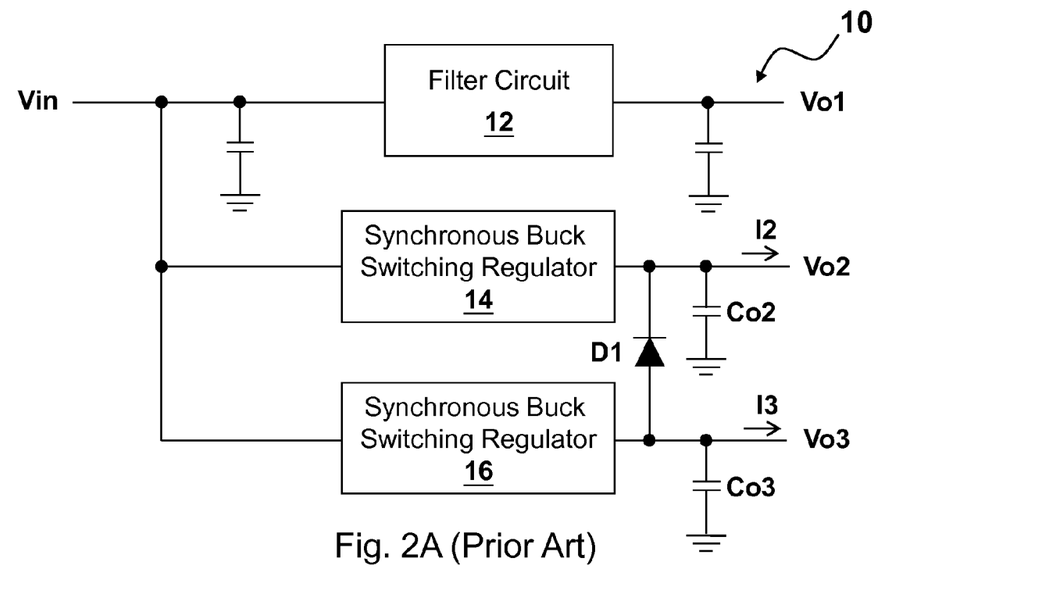
FIG. 2A shows another conventional power supply circuit.
Figure 2B:
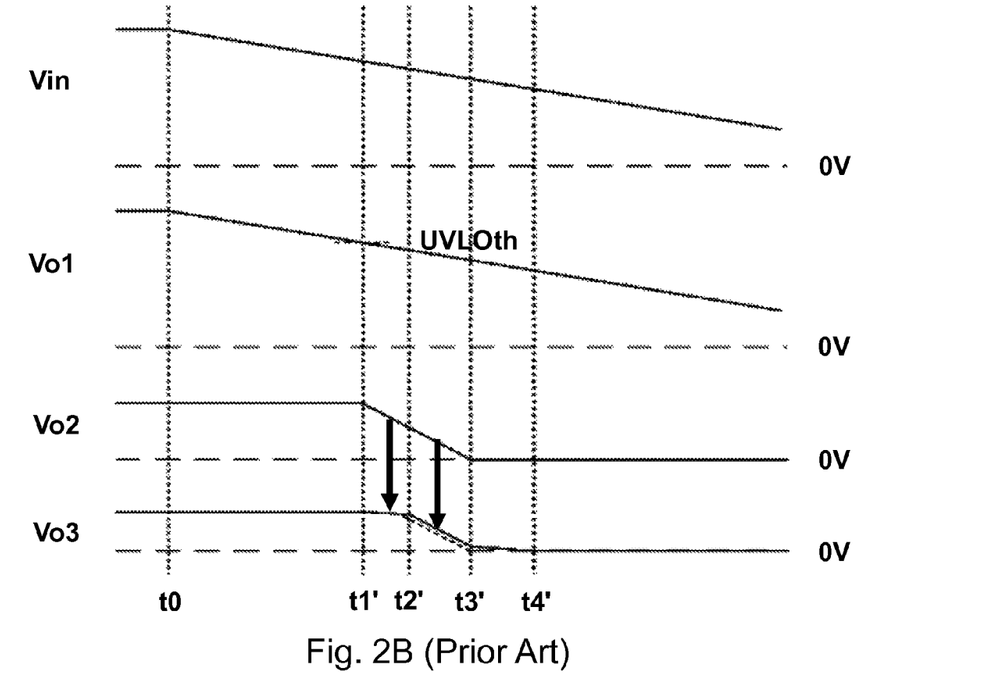
FIG. 2B illustrates the signal waveforms corresponding to the circuit of FIG. 2A.

FIG. 2A and FIG. 2B show another conventional power supply circuit which is designed to overcome the drawbacks in the above-mentioned prior art. As shown in FIG. 2A, the power supply circuit 10 connects a diode D1 between the output voltage Vo2 of the synchronous buck switching regulator 14 and the output voltage Vo3 of the synchronous buck switching regulator 16. The positive terminal of the diode is connected to the lower output voltage Vo3 (3.3V in a normal operation), and the negative terminal of the diode is connected to the higher output voltage Vo2 (5V in a normal operation). Hence, when the power supply circuit 10 enters the shutdown procedure, the signal waveforms of the input voltage Vin and the output voltages Vo1, Vo2 and Vo3 are as shown in FIG. 2B. That is, when the shutdown procedure begins at the time point t0, the input voltage Vin begins to decrease. When the input voltage Vin decreases to the Under-Voltage Lockout threshold UVLOth at the time point t1', the synchronous buck switching regulators 14 and 16 stop converting the input voltage Vin to the output voltages Vo2 and Vo3, and the load circuits begin to decrease the output voltages Vo2 and Vo3. Assuming that the loading current I2 is greater than the loading current I3, between the time points t2' and t3', owing to the presence of the diode D1, when the output voltages Vo3 is greater than the output voltages Vo2 plus the forward voltage of the diode D1, the charges stored in the output capacitor Co3 will flow to the terminal of the output voltage Vo2 via the diode D1 and will be depleted by the loading current I2 to the output Vo2. At the time point t3', the output voltage Vo3 decreases below the forward voltage of the diode D1; at the time point t4', the output voltage Vo3 decreases to 0V.

Although the prior art shown in FIG. 2A overcomes the drawbacks of the prior art shown in FIG. 1A, the prior art shown in FIG. 2A still has several drawbacks as follow:

(1) The use of a diode increases the cost.
(2) Since it is desired for the diode to have a very small forward voltage, such diode having such very small forward voltage requires an even higher cost.
(3) The output voltage Vo3 is still greater than (although with a small amplitude) the output voltages Vo2 between the time points t2' and t4', which may lead to an undesired operation of the load circuit.

In view of above, to overcome the drawbacks in the prior art, the present invention proposes a switching regulator which ensures the output voltages Vo1, Vo2 and Vo3 to have the relationship Vo1>Vo2>Vo3 in the shutdown procedure, regardless of the loading conditions of the load circuits. In addition, the waveforms of the output voltages generated by the proposed switching regulator are monotonic. The present invention also provides a method for controlling a switching regulator, which has the above advantages as well.

SUMMARY OF THE INVENTION

A first objective of the present invention is to provide a switching regulator.

A second objective of the present invention is to provide a control circuit for a switching regulator.

A third objective of the present invention is to provide a control method for controlling a switching regulator.

A fourth objective of the present invention is to provide a power supply circuit.

To achieve the objectives mentioned above, from one perspective, the present invention provides a power stage circuit for converting an input voltage to an output voltage; an error amplifier circuit for comparing a feedback signal relating to the output voltage with a reference signal to generate an error amplified signal, wherein after it is determined that the switching regulator has entered a shutdown procedure, the reference signal gradually decreases along with a decrease of the input voltage; and a pulse width modulation (PWM) signal generation circuit, for generating a PWM signal according to the error amplified signal to control the power stage circuit.

From another perspective, the present invention provides a control method for controlling a switching regulator, wherein the switching regulator is for converting an input voltage to an output voltage, the method for controlling a switching regulator comprising the steps of: comparing a feedback signal relating to the output voltage with a reference signal to generate an error amplified signal; generating a PWM signal according to the error amplified signal to control the conversion from the input voltage to the output voltage; determining whether the switching regulator has entered a shutdown procedure; and after it is determined that the switching regulator has entered a shutdown procedure, gradually decreasing the reference signal along with a decrease of the input voltage so that the output voltage is gradually decreased concurrently.

From still another perspective, the present invention provides a power supply circuit for converting an input voltage to a plurality of output voltages, the power supply circuit comprising: a first output voltage circuit, for outputting a first output voltage according to the input voltage, wherein the first output voltage circuit is, for example, a filter circuit and the level of the first output voltage is substantially the same as the input voltage; and at least one switching regulator, for outputting at least one second output voltage according to the input voltage, the switching regulator comprising: a power stage circuit for converting the input voltage to the second output voltage; an error amplifier circuit for comparing a feedback signal relating to the second output voltage with a reference signal to generate an error amplified signal, wherein when it is determined that the switching regulator has entered the shutdown procedure, the reference signal gradually decreases along with a decrease of the input voltage; and a PWM signal generation circuit for generating a PWM signal according to the error amplified signal to control the power stage circuit.

From still another perspective, the present invention provides a control circuit for a switching regulator, wherein the switching regulator is for converting an input voltage to an output voltage, the control circuit comprising: an error amplifier circuit for comparing a feedback signal relating to the output voltage with a reference signal to generate an error amplified signal, wherein when it is determined that the switching regulator has entered the shutdown procedure, the reference signal gradually decreases along with a decrease of the input voltage; and a pulse width modulation (PWM) signal generation circuit for generating a PWM signal according to the error amplified signal to control the conversion from the input voltage to the output voltage.

In one embodiment, the switching regulator preferably further comprises a reference signal generation circuit, for generating a first reference signal according to the input voltage, wherein the first reference signal gradually decreases along with the decrease of the input voltage, and wherein when it is determined that the switching regulator has entered the shutdown procedure, the error amplifier circuit uses the first reference signal as the reference signal and compares the first reference signal with the feedback signal, and wherein the error amplifier circuit, when in normal operation, used a second reference signal as the reference signal and compares the second reference signal with the feedback signal.

In one embodiment, the relationship between the first reference signal and the input voltage is represented by the following equation:

$$Vref1=(Vin-Vofs)/K$$

wherein Vref1 is the first reference signal, Vin is the input voltage, Vofs is a predetermined offset, and K is a constant or a function.

In the aforementioned embodiment, K, for example, is preferably represented by the following equation:

$$K=(Vthh1-Vthl1)/Vref2$$

wherein Vref2 is the second reference signal, Vthh1 is a high threshold voltage and Vthl1 is a low threshold voltage, and wherein when the input voltage decreases to the high threshold voltage, it is determined that the switching regulator has entered the shutdown procedure and the error amplifier circuit uses the first reference signal as the reference signal and compares the first reference signal with the feedback signal; and when the input voltage decreases to the low threshold voltage Vthl1, the first reference signal Vref1 is decreased to a shutdown threshold. The predetermined offset Vofs for example can be set as the low threshold voltage Vthl1.

In one embodiment, the power supply circuit can comprise at least two switching regulators for generating at least a higher second output voltage and a lower second output voltage, and during the shutdown procedure, the time point when the higher second output voltage decreases to a corresponding shutdown threshold of the higher second output voltage is not later than the time point when the lower second output voltage decreases to a corresponding shutdown threshold of the lower second output voltage.

The objectives, technical details, features, and effects of the present invention will be better understood with regard to the detailed description of the embodiments below.

DESCRIPTION OF THE PREFERRED EMBODIMENTS

Figure 3:
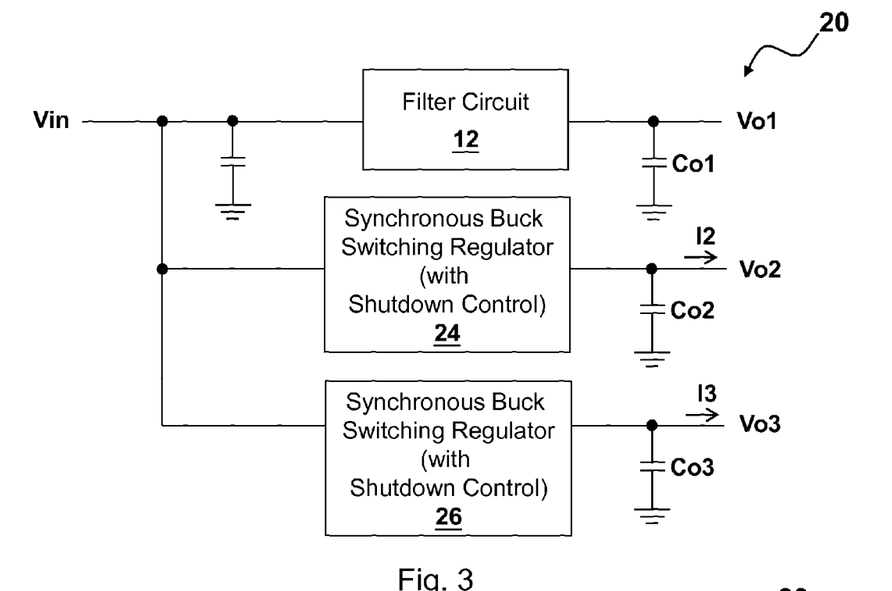
FIG. 3 shows an embodiment of the present invention.

FIG. 3 shows an embodiment of the present invention. This embodiment shows an application structure where the present invention can be applied to; however, the present invention is not limited to such application. The power supply circuit 20 in the embodiment shown in FIG. 3 is for converting an input voltage Vin to multiple output voltages Vo1, Vo2, and Vo3, wherein the input voltage Vin is for example but not limited to 12V and the output voltages Vo1, Vo2, and Vo3 are for example but not limited to 12V, 5V, and 3.3V, respectively. The power supply circuit 20 comprises a filter circuit 12, a switching regulator 24 and a switching regulator 26, wherein the filtering circuit 12 filters the input voltage Vin to generate the output voltage Vo1 without decreasing the voltage; the switching regulator 24 and a switching regulator 26 convert the input voltage Vin to the output voltages Vo2 and Vo3, respectively. In the shown embodiment, the level of the output voltage Vo1 is substantially the same as the level of the input voltage Vin, and the filter circuit 12 is used for filtering the noises; however, if noises are not a concern, the filter circuit 12 can be omitted. This embodiment is different from the prior art in that the switching regulator 24 and the switching regulator 26 are equipped with a shutdown control. When the input voltage Vin decreases and the switching regulator 24 and the switching regulator 26 enter a shutdown procedure, they adaptively decrease the output voltages Vo2 and Vo3 respectively to a corresponding shutdown threshold (for example, 0V) according to the input voltage Vin, and further, the time point when the output voltage Vo3 (3.3V) generated by the switching regulator 26 is decreased to the shutdown threshold (0V) is not later than the time points when the output voltages Vo1 (12V) and Vo2 (5V) generated by the switching regulator 24 are decreased to the shutdown threshold, and the time point when the output voltage Vo2 (5V) generated by the switching regulator 24 is decreased to the shutdown threshold (0V) is not later than the time point when the output voltage Vo1 (12V) generated by the filter circuit 12 is decreased to the shutdown threshold. That is to say, during the shutdown procedure, the time point when a lower output voltage is decreased to the shutdown threshold thereof is not later than the time point when a higher output voltage is decreased to the shutdown threshold thereof, so that the required specification of the power supply circuit is fulfilled. The present invention does not require a specific diode D1 as in the prior art, so the cost is reduced. Note that it is also within the scope of the present invention if only one of the switching regulator 24 and the switching regulator 26 is equipped with the shutdown control.

Figure 4A:
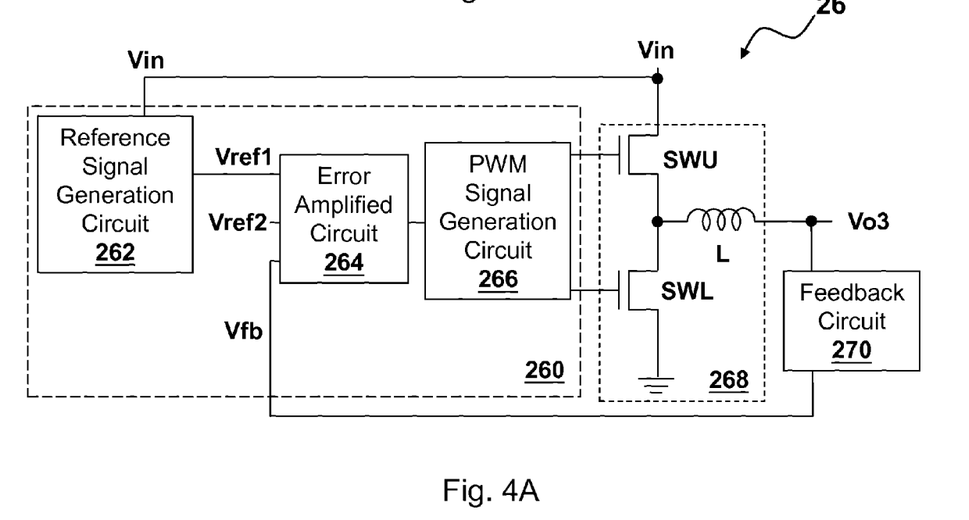
FIG. 4A shows a specific embodiment of a switching regulator according to the present invention.

Referring to FIG. 4A, it shows an embodiment for the switching regulator 24 or 26 according to the present invention, to illustrate how the switching regulator 24 or 26 adaptively decreases the output voltage Vo2 or Vo3 to a shutdown threshold according to the input voltage Vin. For simplicity, the switching regulator 26 is taken as an illustrative example in the follow description. As shown in FIG. 4A, the switching regulator 26 comprises a control circuit 260, a power stage circuit 268 and a feedback circuit 270, wherein the feedback circuit 270 can be omitted if desired, and under the condition that the feedback circuit 270 is omitted, the output voltage Vo3 is used as the feedback signal Vfb. The control circuit 260 comprises a reference signal generation circuit 262, an error amplifier circuit 264 and a pulse width modulation (PWM) signal generation circuit 266. The reference signal generation circuit 262 generates a first reference signal Vref1 according to the input voltage Vin. The error amplifier circuit 264 compares the feedback signal Vfb with the first reference signal Vref1 or the second reference signal Vref2 to generate an error amplified signal which is outputted to the PWM signal generation circuit 266. The PWM signal generation circuit 266 generates a PWM signal according to the error amplified signal to control the upper switch SWU and the lower switch SWL of the power stage circuit 268, thereby generating the output voltage Vo3 via an inductor L.

The error amplifier circuit 264, in normal operation, compares the feedback signal Vfb with the second reference signal Vref2 to regulate the feedback signal Vfb to the level of the second reference signal Vref2 according to the feedback balance mechanism of the loop, thus controlling the output voltage Vo3. When switching regulator 26 enters the shutdown procedure, the input voltage Vin decreases. The first reference signal Vref1 generated by the reference signal generation circuit 262 gradually decreases along with the decrease of the input voltage Vin. When the first reference signal Vref1 is lower than the reference signal for normal operation (that is, the second reference signal Vref2), the first reference signal Vref1 replaces the second reference signal Vref2 and becomes the basis for comparison. That is, the error amplifier circuit 264 now compares the first reference signal Vref1 with the feedback signal Vfb to regulate the feedback signal Vfb to the level of the first reference signal Vref1 according to the feedback balance mechanism of the loop, thus causing the output voltage Vo3 to adaptively and gradually decrease along with the decrease of the input voltage Vin, until the output voltage Vo3 drops to a shutdown threshold (for example, 0V).

Figure 4B:
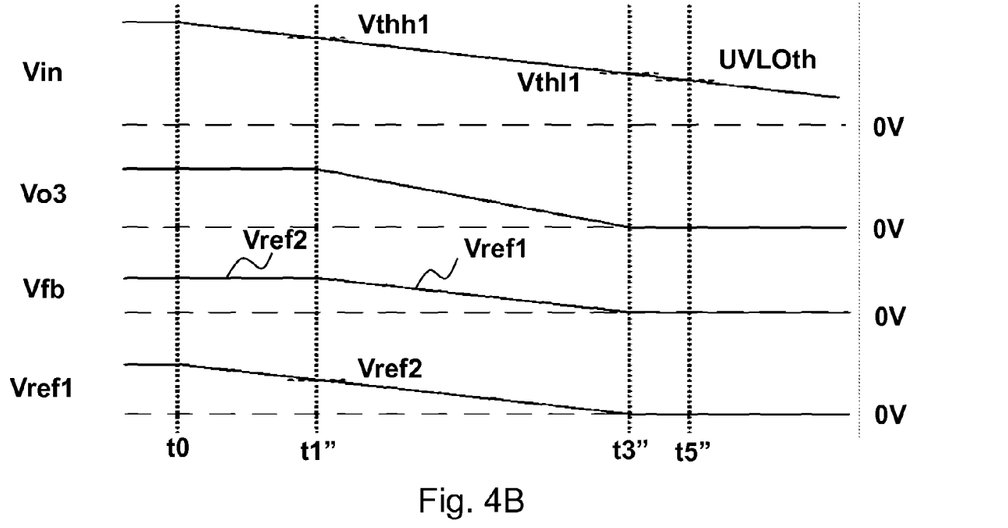
FIG. 4B shows the waveforms corresponding to the circuit of FIG. 4A.

More specifically, please refer to FIG. 4B, which shows the waveforms corresponding to the circuit of FIG. 4A. As shown in FIG. 4B, when the switching regulator 26 enters the shutdown procedure, first at the time point t0, the input voltage Vin begins to decrease. According to the present invention, the first reference signal Vref1 gradually decreases along with the decrease of the input voltage Vin. When the input voltage Vin decreases to a predetermined high threshold voltage Vthh1 or when the first reference signal Vref1 decreases to the second reference signal Vref2, the error amplifier circuit 264 uses the first reference signal Vref1 instead of the second reference signal Vref2 as the basis for comparison. The feedback balance mechanism of the loop then regulates the feedback signal Vfb to the level of the first reference signal Vref1, thus causing the output voltage Vo3 to correspondingly decrease to 0V at the time point t3" (the time point t3" is the time point when the input voltage Vin decreases to a predetermined low threshold voltage Vthl1).

In FIG. 4B, the high threshold voltage Vthh1 corresponds to the level of the input voltage Vin when the first reference signal Vref1 is equal to the second reference signal Vref2. This arrangement is for the purpose to prevent the output voltage Vo3 from being impacted by the noise and minute fluctuation of the input voltage Vin. That is, it is when the input voltage Vin is lower than the predetermined high threshold voltage Vthh1 that the switching regulator 26 is determined to have entered the shutdown procedure and the first reference signal Vref1 starts to replace the second reference signal Vref2. If the input voltage Vin is not lower than the predetermined high threshold voltage Vthh1, the switching regulator 26 is regarded as in normal operation and the second reference signal Vref2 is still used as the comparison basis by the error amplifier circuit 264. Certainly, it should be understood that the above-mentioned preferred embodiment is for illustrative purpose, but not for limiting the scope of the present invention. It is also practicable and within the scope of the present invention that the error amplifier circuit 264 substitutes the first reference signal Vref1 for the second reference signal Vref2 directly at the time point t0 without setting the high threshold voltage Vthh1.

Furthermore, the purpose of setting up the low threshold voltage Vthl1 is to control the time point t3" so that the time point when the output voltage Vo3 is decreased to 0V is earlier than the time point when the input voltage Vin is equal to or lower than an Under-Voltage Lockout threshold UVLOth. This is because the switching regulator 26 will stop controlling the voltage conversion operation when the input voltage Vin is equal to or lower than the Under-Voltage Lockout threshold UVLOth. Therefore, the setting of the low threshold voltage Vthl1 can ensure that the output voltage Vo3 is controllable to be decreased to 0V if the low threshold voltage Vthl1 is set higher than the Under-Voltage Lockout threshold UVLOth. Because the output voltage Vo1 is about the same as the input voltage Vin, this also ensures that the output voltage Vo3 is decreased to 0V earlier than the output voltage Vo1. Certainly, it should be understood that the above-mentioned preferred embodiment is for illustrative purpose, but not for limiting the scope of the present invention. It is also practicable and within the scope of the present invention that the low threshold voltage Vthl1 is not set up, or the low threshold voltage Vthl1 is set to any value that is lower than the Under-Voltage Lockout threshold UVLOth.

In addition, the second reference signal Vref2 is shown in FIG. 4B as a constant value for example, but it can be replaced by a variable value. For example, under some application schemes, the circuit coupled to the output terminal will send a control signal to the power supply circuit to dynamically alter the output voltage. In this case, the second reference signal Vref2 will therefore be dynamically adjusted.

In the aforementioned mechanism, the first reference signal Vref1 is for example but not limited to be set according to the following equation:

$$Vref1=(Vin-Vofs)/K$$

wherein Vofs is a predetermined offset, and K is a constant or a function. Vofs and K can be designed depending on requirements. In the embodiment shown in FIG. 4B, the predetermined offset Vofs is set as the low threshold voltage Vthl1, thus determining the time point t3"; the constant K determines the decreasing velocity (slope) of the first reference signal Vref1, thus determining the time point t1" where the first reference signal Vref1 intersects with the second reference signal Vref2. Moreover, in the embodiment shown in FIG. 4B, K is for example set by the following equation:

$$K=(Vthh1-Vthl1)/Vref2$$

Certainly, as described previously, Vofs and K can be set as any other values. For example, the predetermined offset Vofs can be set equal to the Under-Voltage Lockout threshold UVLOth, or equal to any other value that is greater than zero; K can be set as any decreasing velocity.

Figure 4C:
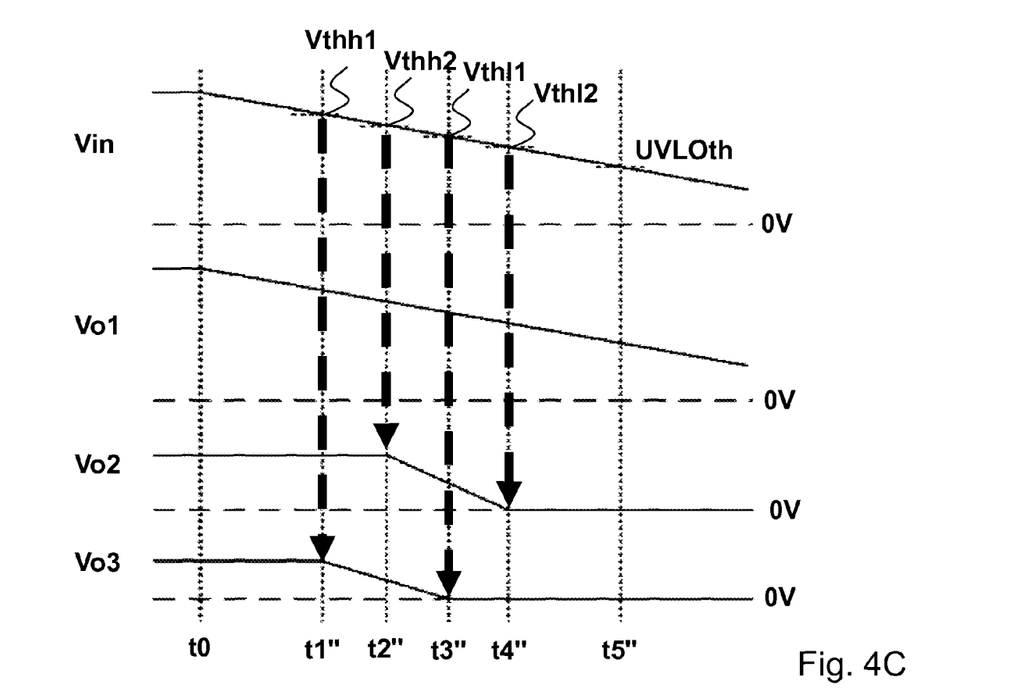
FIG. 4C shows the waveforms which illustrate that the switching regulator 24 and the switching regulator 26, via an appropriate setup, can ensure the desired relationship Vo1>Vo2>Vo3 among the output voltages.

In the application structure of the embodiment shown in FIG. 3, there are two switching regulators 24 and 26 and it is desired to ensure that the output voltages Vo1, Vo2 and Vo3 have the relationship Vo1>Vo2>Vo3 when the switching regulators 24 and 26 enter the shutdown procedure. Under such circumstance, referring to FIG. 4C, the predetermined offset Vofs for the switching regulator 26 can be set as Vthl1 and K can be set as (Vthh1−Vthl1)/Vref2; the predetermined offset Vofs for the switching regulator 24 can be set as Vthl2 and K can be set as (Vthh2−Vthl2)/(Vref2'), wherein Vthh1>Vthh2>Vthl1>Vthl2>UVLOth, in which Vref2' is the comparison basis of the error amplifier circuit of the switching regulator 24. Since Vthh1, Vthh2, Vthl1, and Vthl2 respectively determine the time points t1", t2", t3", and t4", and the output voltage Vo1 can only decrease to 0V after the input voltage Vin is lower than UVLOth, the output voltages Vo1, Vo2, and Vo3 have the desired relationship Vo1>Vo2>Vo3 during the shutdown procedure, by the above settings.

Figure 5A:
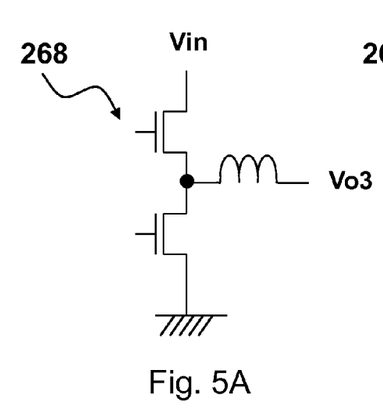
FIGS. 5A and 5B show two embodiments of a power stage circuit.
Figure 5B:
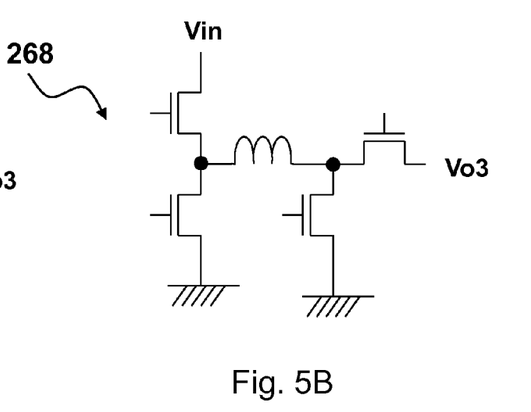

FIG. 5A and FIG. 5B show two embodiments of a power stage circuit (for example to be used in the switching regulator 26 as the power stage circuit 268). As shown in FIG. 5A and FIG. 5B, the power stage circuit 268 is for example but not limited to a buck converter or a buck-boost converter.

Figure 6:
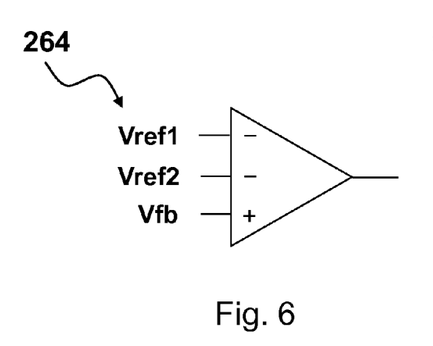
FIG. 6 shows an embodiment of an error amplifier circuit.

FIG. 6 shows an embodiment of an error amplifier circuit. The error amplifier circuit 264, as shown in FIG. 6, for example has three input terminals, and it compares the lowest negative input signal with the positive input signal, that is, it compares the feedback signal with one of the first reference signal Vref1 and the second reference signal Vref2 that has the lower absolute value. The error amplifier circuit 264 is not limited to the circuit shown in the figure, and it can be embodied in other forms.

Figure 7A:
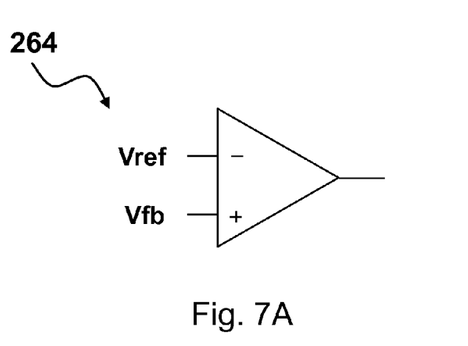
FIGS. 7A-7C explain the operation of the present invention.
Figure 7B:
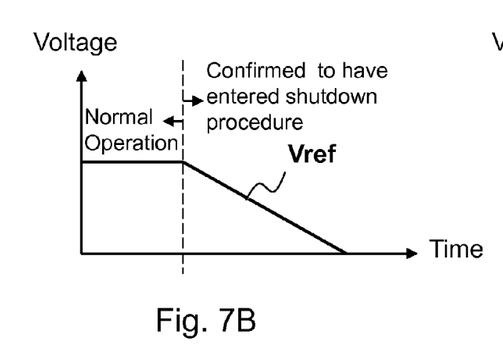
Figure 7C:
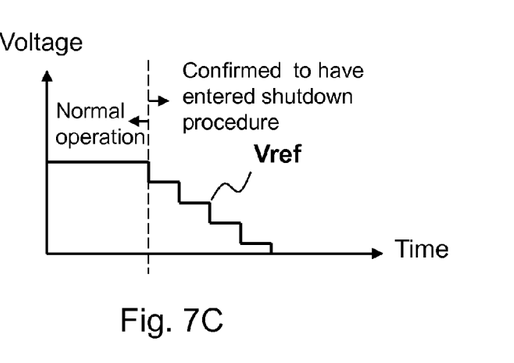

FIGS. 7A-7C explain the operation of the present invention. In the switching regulator, the error amplifier circuit (for example the error amplifier circuit 264 of the switching regulator 26) compares the feedback signal Vfb with the reference signal Vref to regulate the feedback signal Vfb to the level of the reference signal Vref according to the feedback balance mechanism of the loop, thus controlling the output voltage. According to the present invention, when it is determined that the switching regulator has entered a shutdown procedure, the reference voltage Vref is gradually decreased so that the output voltage is controlled to gradually decrease to zero; (the time point when it is determined that the switching regulator has entered the shutdown procedure can be the beginning of the shutdown procedure, such as t0 in FIG. 4B, or after a buffer period for safety, such as t1" in FIG. 4B). The decreasing velocity (slope) of the reference signal Vref and the time point when it is decreased to zero can be set according to requirements. However, it should be understood that the waveform of the reference signal Vref shown in FIG. 7B and the method for generating it as described with reference to the above embodiments are for illustrative purpose, but not for limiting the scope of the present invention. Any method that produces a decreasing waveform of the reference signal Vref after the shutdown procedure is confirmed is within the scope of the present invention. In addition, it should be understood that the waveform of the reference signal Vref is not limited to a downward slope. For example, a step-wise waveform shown in FIG. 7C, or other regular or irregular decreasing waveforms should be within the scope of the present invention.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch. For another example, the positive and negative input terminals of an error amplifier circuit or a comparator are interchangeable, with corresponding amendments of the circuits processing these signals. For yet another example, the Under-Voltage Lockout threshold UVLOth is not absolutely required, and the present invention can also be applied to a power supplying circuit that does not set up the Under-Voltage Lockout threshold UVLOth (for example but not limited to a power supply circuit that generates dual power). For still another example, the present invention can also be applied to generating only one output voltage instead of generating two or more than two output voltages. In view of the foregoing, the spirit of the present invention should cover all such and other modifications and variations, which should be interpreted to fall within the scope of the following claims and their equivalents.

What is claimed is:

1. A switching regulator comprising:
   a power stage circuit for converting an input voltage to an output voltage;
   an error amplifier circuit for comparing a feedback signal relating to the output voltage with a reference signal to generate an error amplified signal, wherein after it is determined that the switching regulator has entered a shutdown procedure, the reference signal gradually decreases along with a decrease of the input voltage;
   a pulse width modulation (PWM) signal generation circuit, for generating a PWM signal according to the error amplified signal to control the power stage circuit; and
   a reference signal generation circuit for generating a first reference signal according to the input voltage, wherein the first reference signal gradually decreases along with the decrease of the input voltage, and wherein when it is determined that the switching regulator has entered the shutdown procedure, the error amplifier circuit uses the first reference signal as the reference signal and compares the first reference signal with the feedback signal;

wherein a relationship between the first reference signal and the input voltage is represented by the following equation:

$$Vref1=(Vin-Vofs)/K$$

wherein Vref1 is the first reference signal, Vin is the input voltage, Vofs is a predetermined offset, and K is a constant or a function.

2. The switching regulator of claim 1, wherein the error amplifier circuit, in a normal operation, uses a second reference signal as the reference signal and compares the second reference signal with the feedback signal.

3. The switching regulator of claim 1,
wherein the error amplifier circuit, in a normal operation, uses a second reference signal as the reference signal and compares the second reference signal with the feedback signal, and K is represented by the following equation:

$$K=(Vthh1-Vthl1)/Vref2$$

wherein Vref2 is the second reference signal, Vthh1 is a high threshold voltage and Vthl1 is a low threshold voltage, and wherein when the input voltage decreases to the high threshold voltage, it is determined that the switching regulator has entered the shutdown procedure, and the error amplifier circuit uses the first reference signal as the reference signal and compares the first reference signal with the feedback signal; and when the input voltage decreases to the low threshold voltage Vthl1, the first reference signal Vref1 is decreased to a shutdown threshold.

4. The switching regulator of claim 1, wherein the reference signal decreases continuously or discontinuously.

5. A control method for controlling a switching regulator, wherein the switching regulator is for converting an input voltage to an output voltage, the method for controlling a switching regulator comprising the steps of:
comparing a feedback signal relating to the output voltage with a reference signal to generate an error amplified signal;
generating a PWM signal according to the error amplified signal to control the conversion from the input voltage to the output voltage;
determining whether the switching regulator has entered a shutdown procedure; and
after it is determined that the switching regulator has entered a shutdown procedure, gradually decreasing the reference signal along with a decrease of the input voltage so that the output voltage is gradually decreased concurrently;
wherein the step of decreasing the reference signal includes:
generating a first reference signal according to the input voltage, wherein the first reference signal gradually decreases along with the decrease of the input voltage; and
using the first reference signal as the reference signal and comparing the first reference signal with the feedback signal after it is determined that the switching regulator has entered the shutdown procedure;

wherein a relationship between the first reference signal and the input voltage is represented by the following equation:

$$Vref1=(Vin-Vofs)/K$$

wherein Vref1 is the first reference signal, Vin is the input voltage, Vofs is a predetermined offset, and K is a constant or a function.

6. The control method of claim 5, wherein the step of determining whether the switching regulator has entered a shutdown procedure includes:
determining whether the input voltage is lower than a high threshold voltage.

7. The control method of claim 5, further comprising the steps of:
gradually decreasing the reference signal to a shutdown threshold before the input voltage decreases to a predetermined value.

8. The control method of claim 5, further comprising:
before it is determined that the switching regulator has entered a shutdown procedure, using a second reference signal as the reference signal and comparing the second reference signal with the feedback signal, wherein K is represented by the following equation:

$$K=(Vthh1-Vthl1)/Vref2$$

wherein Vref2 is the second reference signal, Vthh1 is a high threshold voltage and Vthl1 is a low threshold voltage, and
wherein when the input voltage decreases to the high threshold voltage Vthh1, it is determined that the switching regulator has entered the shutdown procedure, and the first reference signal is used as the reference signal to be compared with the feedback signal; and when the input voltage decreases to the low threshold voltage Vthl1, the first reference signal Vref1 is decreased to a shutdown threshold.

9. A power supply circuit for converting an input voltage to a plurality of output voltages, the power supply circuit comprising:
a first voltage outputting circuit for outputting a first output voltage according to the input voltage; and
at least one switching regulator for outputting at least one second output voltage according to the input voltage, the switching regulator comprising:
a power stage circuit for converting the input voltage to the second output voltage;
an error amplifier circuit for comparing a feedback signal relating to the second output voltage with a reference signal to generate an error amplified signal, wherein when it is determined that the switching regulator has entered the shutdown procedure, the reference signal gradually decreases along with a decrease of the input voltage;
a PWM signal generation circuit for generating a PWM signal according to the error amplified signal to control the power stage circuit; and
a reference signal generation circuit, for generating a first reference signal according to the input voltage, wherein the first reference signal gradually decreases along with the decrease of the input voltage, and wherein when it is determined that the switching regulator has entered the shutdown procedure, the error amplifier circuit uses the first reference signal as the reference signal and compares the first reference signal with the feedback signal;

wherein a relationship between the first reference signal and the input voltage is represented by the following equation:

$$Vref1=(Vin-Vofs)/K$$

wherein Vref1 is the first reference signal, Vin is the input voltage, Vofs is a predetermined offset, and K is a constant or a function.

10. The power supply circuit of claim 9, wherein the error amplifier circuit, in a normal operation, uses a second reference signal as the reference signal and compares the second reference signal with the feedback signal.

11. The power supply circuit of claim 9,
wherein the error amplifier circuit, in a normal operation, uses a second reference signal as the reference signal and compares the second reference signal with the feedback signal, and K is represented by the following equation:

$$K=(Vthh1-Vthl1)/Vref2$$

wherein Vref2 is the second reference signal, Vthh1 is a high threshold voltage and Vthl1 is a low threshold voltage, and
wherein when the input voltage decreases to the high threshold voltage Vthh1, it is determined that the switching regulator has entered the shutdown procedure, and the error amplifier circuit uses the first reference signal as the reference signal and compares the first reference signal with the feedback signal; and when the input voltage decreases to the low threshold voltage Vthl1, the first reference signal Vref1 is decreased to a shutdown threshold.

12. The power supply circuit of claim 9, wherein the reference signal gradually decreases continuously or discontinuously.

13. The power supply circuit of claim 9, wherein the at least one switching regulator includes at least two switching regulators for outputting at least a higher second output voltage and a lower second output voltage, and during the shutdown procedure, the time point when the higher second output voltage decreases to a corresponding shutdown threshold of the higher second output voltage is not later than the time point when the lower second output voltage decreases to a corresponding shutdown threshold of the lower second output voltage.

14. The power supply circuit of claim 9, wherein the first output voltage circuit is a filter circuit and the level of the first output voltage is substantially the same as the input voltage.

15. A control circuit for a switching regulator, wherein the switching regulator is for converting an input voltage to an output voltage, the control circuit comprising:
an error amplifier circuit for comparing a feedback signal relating to the output voltage with a reference signal to generate an error amplified signal, wherein when it is determined that the switching regulator has entered the shutdown procedure, the reference signal gradually decreases along with a decrease of the input voltage;
a pulse width modulation (PWM) signal generation circuit, for generating a PWM signal according to the error amplified signal to control the conversion from the input voltage to the output voltage; and
a reference signal generation circuit, for generating a first reference signal according to the input voltage, wherein the first reference signal gradually decreases along with the decrease of the input voltage, and wherein when it is determined that the switching regulator has entered the shutdown procedure, the error amplifier circuit uses the first reference signal as the reference signal and compares the first reference signal with the feedback signal;
wherein a relationship between the first reference signal and the input voltage is represented by the following equation:

$$Vref1=(Vin-Vofs)/K$$

wherein Vref1 is the first reference signal, Vin is the input voltage, Vofs is a predetermined offset, and K is a constant or a function.

16. The control circuit of claim 15, wherein the error amplifier circuit, in a normal operation, uses a second reference signal as the reference signal and compares the second reference signal with the feedback signal.

17. The control circuit of claim 15,
wherein the error amplifier circuit, in a normal operation, uses a second reference signal as the reference signal and compares the second reference signal with the feedback signal, and K is represented by the following equation:

$$K=(Vthh1-Vthl1)/Vref2$$

wherein Vref2 is the second reference signal, Vthh1 is a high threshold voltage and Vthl1 is a low threshold voltage, and
wherein when the input voltage decreases to the high threshold voltage Vthh1, it is determined that the switching regulator has entered the shutdown procedure, and the error amplifier circuit uses the first reference signal as the reference signal and compares the first reference signal with the feedback signal; and when the input voltage decreases to the low threshold voltage Vthl1, the first reference signal Vref1 is decreased to a shutdown threshold.

18. The control circuit of claim 15, wherein the reference signal gradually decreases continuously or discontinuously.

* * * * *